(12) United States Patent
Heanley

(10) Patent No.: US 11,920,513 B2
(45) Date of Patent: Mar. 5, 2024

(54) MONO-BLOCK RECIPROCATING PISTON COMPOSITE ICE/ORC POWER PLANT

(71) Applicants: CAE (IP) LLP, Surrey (GB); Julien Roger Heanley, Manchester (GB)

(72) Inventor: Christopher Heanley, Surrey (GB)

(73) Assignee: CAE (IP) LLP, Surrey (GB)

(*) Notice: Subject to any disclaimer, the term of this patent is extended or adjusted under 35 U.S.C. 154(b) by 0 days.

(21) Appl. No.: 18/043,485

(22) PCT Filed: Aug. 30, 2021

(86) PCT No.: PCT/EP2021/073919
§ 371 (c)(1),
(2) Date: May 5, 2023

(87) PCT Pub. No.: WO2022/043565
PCT Pub. Date: Mar. 3, 2022

(65) Prior Publication Data
US 2023/0250751 A1     Aug. 10, 2023

(30) Foreign Application Priority Data
Aug. 28, 2020   (GB) ...................... 2013605

(51) Int. Cl.
*F02B 41/00*     (2006.01)
*F01K 7/36*      (2006.01)
(Continued)

(52) U.S. Cl.
CPC ............. *F02B 41/00* (2013.01); *F01K 7/36* (2013.01); *F01K 23/065* (2013.01); *F01K 25/10* (2013.01); *Y02T 10/12* (2013.01)

(58) Field of Classification Search
CPC ............................ F01K 23/065; F02B 41/00
See application file for complete search history.

(56) References Cited

U.S. PATENT DOCUMENTS 4,901,531 A * 2/1990 Kubo ...................... F02G 5/02
                                                          60/618
6,095,100 A   8/2000 Hughes
(Continued)

FOREIGN PATENT DOCUMENTS

CN    104533604    4/2015
CN    112260316    1/2021
(Continued)

OTHER PUBLICATIONS

ISR and Written Opinion for PCT/EP2021/073919 (dated Jan. 14, 2022) (9 pages).
(Continued)

*Primary Examiner* — Laert Dounis

(57) ABSTRACT

An apparatus, system and method for generating power, utilising a novel mono-block reciprocating piston engine with reduced or zero harmful emissions. The mono-block comprises a composite internal combustion IC section and Organic Rankine Cycle ORC section. The mono-block engine comprises two or more cylinders each having a piston housed therein; a composite internal combustion IC section controlling the displacement of at least one of the pistons and; an Organic Rankine Cycle ORC section controlling the displacement of at least one of the pistons; wherein the IC and ORC pistons connect to and drive a common crankshaft of the mono-block engine power plant; and wherein the Organic Rankine Cycle operates by the heat generated by the combustion in the internal combustion section, and the displacement of the pistons in the ORC section is achieved by injecting heated and pressurised ORC fluid.

15 Claims, 13 Drawing Sheets

(51) Int. Cl.
   *F01K 23/06*   (2006.01)
   *F01K 25/10*   (2006.01)

(56)  References Cited

U.S. PATENT DOCUMENTS

2009/0056331 A1     3/2009   Zhao
2010/0083919 A1*   4/2010   Bucknell .................. F02G 5/04
                                                             123/41.21

FOREIGN PATENT DOCUMENTS

| DE | 2414147 A1 * | 10/1975 | |
| DE | 102008013673 B3 | 9/2009 | |
| DE | 102011117356 | 5/2013 | |
| EP | 2513433 A2 | 10/2012 | |
| WO | WO-2005106233 A1 * | 11/2005 | ............. F01K 15/02 |
| WO | WO-2010037912 A2 * | 4/2010 | ............. F01K 15/02 |
| WO | WO-2011073718 A2 * | 6/2011 | ............. F01K 15/02 |

OTHER PUBLICATIONS

Combined Search and Examination Report for GB2112357.5 (dated Feb. 3, 2022) (8 pages).

* cited by examiner

Fully Variable Valve Actuation (FVVA)

EGR Schematic with Cooler

MONO-BLOCK RECIPROCATING PISTON COMPOSITE ICE/ORC POWER PLANT

FIELD OF THE INVENTION

The invention describes apparatus, system and method for generating power, utilising a novel mono-block reciprocating piston engine with reduced or zero harmful emissions. The mono-block comprises a composite internal Combustion IC section and Organic Rankine Cycle ORC section, each section displacing one or more section respective pistons, and all of the pistons connect to and drive a common crank shaft of the mono-block power plant, which may be coupled to one or more electric generators.

BACKGROUND TO THE INVENTION

Internal Combustion Engines ICE are intrinsically inefficient. Current ICE struggle to achieve 20%-35% efficiency. Most of the energy produced from the combustion of the ICE fuel is lost as heat.

This invention proposes a hybrid composite engine of internal combustion IC section and Organic Rankine Cycle ORC section, with a solution that captures the lost heat of the IC engine and converts it in the ORC section into additional mechanical energy for the engine and subsequently into electrical energy.

Furthermore, the invention utilises hydrogen as the IC fuel in order to facilitate the target of 'carbon neutral by 2050'.

The invention addresses the present high initial and life cycle costs of battery and fuel cell alternatives whilst providing extremely high efficiencies and by utilising familiar technology, overcomes the substantial costs associated with re-tooling, retraining and maintenance.

BRIEF DESCRIPTION OF THE DRAWINGS

The invention will now be described by way of example only with reference to the accompanying drawings in which:

FIG. 4 illustrates schematics of pistons and cylinder chambers; wherein FIG. 4a illustrates an IC piston, cylinder chamber and valves; and FIG. 4b illustrates an ORC piston, cylinder ORC expansion chamber, ORC fluid inlet and outlet, and in-cylinder pressure and temperature sensors;

STATEMENT OF INVENTION

Figure 1:
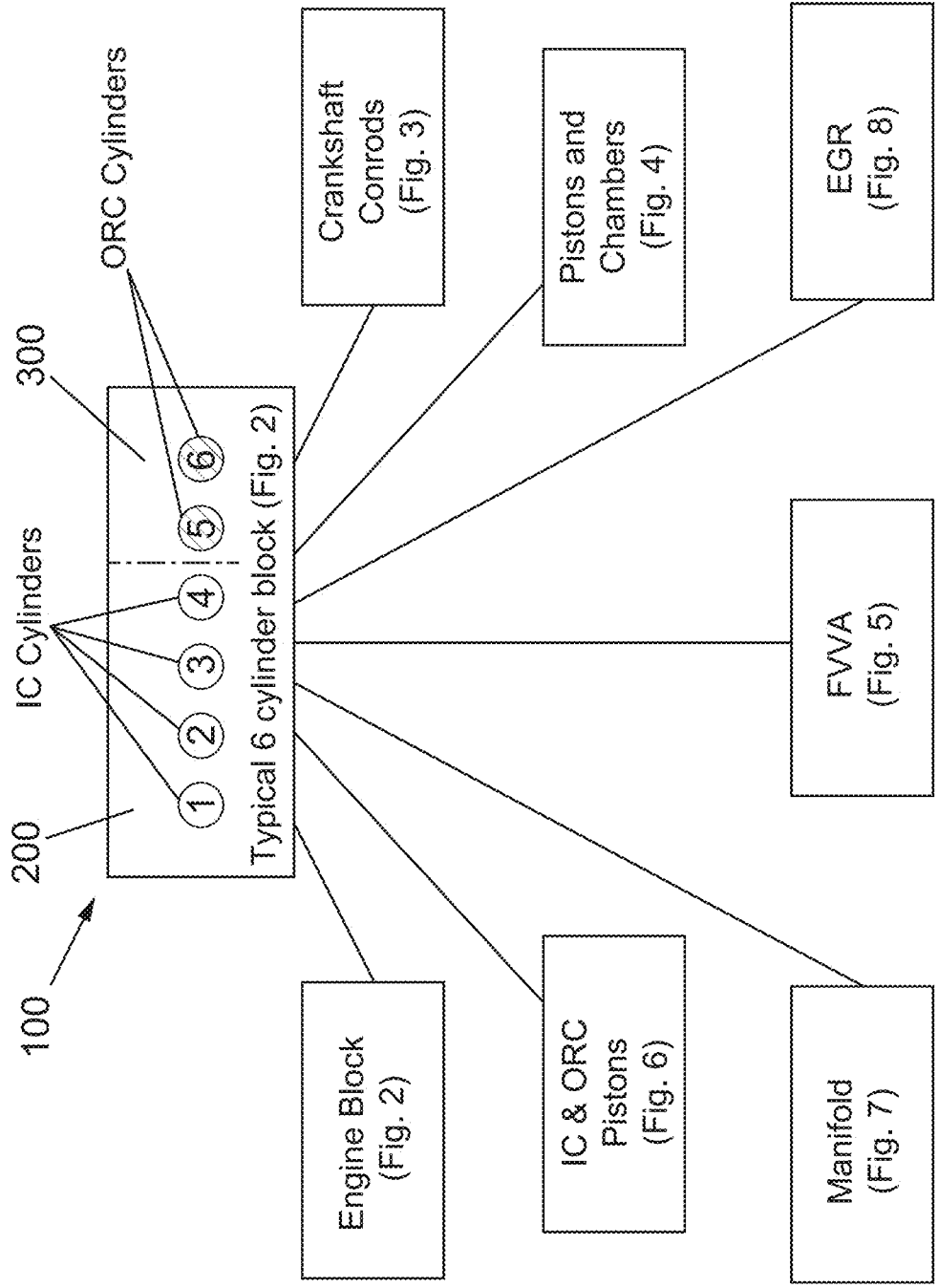
FIG. 1 illustrates an overview schematic of an example system of a mono-block composite with IC and ORC sections in the same mono-block, in accordance with the invention.

According to a first aspect of the invention there is provided a mono-block reciprocating piston engine power plant comprising:

two or more cylinders each having a piston housed therein;

an internal combustion IC section controlling the displacement of at least one of the pistons and;

an Organic Rankine Cycle ORC section controlling the displacement of at least one of the pistons;

wherein the IC and ORC pistons connect to and drive a common crankshaft of the mono-block engine power plant; and wherein the Organic Rankine Cycle operates by the heat generated by the combustion in the internal combustion section, and the displacement of the pistons in the ORC section is achieved by injecting heated and pressurised ORC fluid;

Preferably, the mono-block engine is coupled to one or more electric generators.

Preferably, the one or more electric generators are arranged to charge a rechargeable battery pack or a supercapacitor pack.

Preferably, the one or more electric generators are arranged to crank the engine for it to start, i.e. act as starter motor(s) to the mono-block engine.

Preferably, the shaft of the one or more generators is coupled in line with the crankshaft of the engine, so that the crankshaft and the generator shaft extend in the same virtual linear axis running across the length of the crankshaft.

Preferably, at least one end of the crankshaft is coupled to one or more electric generators.

Preferably the one or more electric generators coupled to the at least one end of the crankshaft are arranged to achieve dynamic balancing of the crankshaft.

Preferably, heated and pressurised ORC fluid is injected from a high pressure tank into an ORC section cylinder causing downward displacement of the piston therein, and on the upward displacement of the piston the ORC fluid is ejected into a condenser, to be recirculated in the ORC cycle.

According to a second aspect of the invention heated and pressurised heated and pressurised ORC fluid is injected from a high pressure tank into a first ORC section cylinder causing downward displacement of a first piston therein;
  on the upward displacement of the first piston the ORC fluid is ejected from the first cylinder:
  wherein if the ORC fluid pressure and heat have decreased below predefined first thresholds, the ORC fluid is deemed a spent-fluid and is ejected into a condenser to be recirculated in the ORC cycle;
  if not, then the ORC fluid is transferred and injected into a second ORC section cylinder causing downward displacement of a second piston therein;
  wherein the ORC fluid is thus continuously circulated between the ORC section cylinders until deemed spent; and
  wherein when the spent ORC fluid is ejected into the condenser it is replaced with heated and pressurised ORC fluid injected into one of the cylinders from the high pressure tank.

According to a third aspect of the invention heated and pressurised ORC fluid is injected from a high pressure tank into a first ORC section cylinder causing downward displacement of a first piston therein;
  on the upward displacement of the first piston the ORC fluid is ejected from the first cylinder:
  wherein if the ORC fluid pressure and heat are above predefined second thresholds, the ORC fluid is transferred and injected into a second ORC section cylinder causing downward displacement of a second piston therein;
  if not, then part of the ORC fluid is ejected into a condenser, to be recirculated in the ORC cycle, and the part is replaced with heated and pressurised ORC fluid from the high pressure tank;
  the resulting mixed ORC fluid is then injected into a second ORC section cylinder causing downward displacement of a second piston therein;
  and wherein the ORC fluid is thus continuously mixed and recirculated between the ORC section cylinders.

Preferably the mono-block is a new bespoke mono-block or it is a repurposed standard IC engine block, wherein a number of the cylinders and pistons are left intact for IC operations and the remaining cylinders and pistons are arranged to be driven by the ORC fluid inside the ORC section cylinders.

Preferably the Organic Rankine Cycle recovers heat from one or a combination of the engine mono-block, exhaust heat and/or engine cooling system.

Preferably the Organic Rankine Cycle recovery utilises one organic ORC fluid, or two organic ORC fluids with two different temperature operating ranges, or a single hybrid ORC fluid arranged to operate with two or more different temperature operating ranges.

Preferably when utilising a hybrid or two ORC fluids arranged to operate with two or more different temperature operating ranges, a first range is configured to operate from engine heat recovered from high temperatures such as exhaust heat, and a second range is configured to operate from engine heat recovered from coolant and scavenging heat recovery.

Preferably the cylinders are wet lined to enable flexible control of cylinder cubic capacity.

Preferably filtrated water, from EGR, is injected into an IC cylinder head at a point immediately prior to the combustion temperature within the cylinder reaching a point where NOx will be formed; and
  the injected water is timed to reach the peak IC cylinder temperature zone immediately prior to NOx threshold temperature being reached.

Preferably filtrated water, from EGR, is injected into an IC cylinder head at a point immediately prior to the combustion temperature within the cylinder reaching a point where NOx will be formed; and
  the injected water is timed to reach the peak IC cylinder temperature zone immediately prior to NOx threshold temperature being reached.

According to a fourth aspect of the invention there is provided a system for generating electricity utilising the above mentioned engines.

According to a fifth aspect of the invention there is provided a method for generating electricity utilising the above mentioned engines.

DESCRIPTION OF THE INVENTION

The invention describes an apparatus, system and method for generating power utilising a novel design for a mono-block reciprocating piston engine with reduced or zero harmful emissions. The mono-block comprises a composite internal combustion IC section and an Organic Rankine Cycle ORC section, each section displacing one or more section respective pistons, and all of the pistons connect to and drive a common crank shaft of the mono-block power plant.

In this description the mono-block may be interchangeably referred to as a common-block or the engine block, or simply the block.

The internal combustion engine ICE component of the block may utilise any combustible fuel known in the art, such as petrol, diesel, etc, as well as gaseous fluids such as methane, butane or propane. However to reduce or avoid resultant carbon emissions the use of cleaner combustible fuels, such as hydrogen is preferred.

In this description, the one or more pistons and cylinders of the ICE section will be referred to as ICE-piston(s) and ICE-cylinder(s).

In the Organic Rankine Cycle ORC section, the one or more pistons and cylinders will be referred to as ORC-piston(s) and ORC-cylinder(s). The one or more ORC-pistons are driven by an internal ORC cycle that to operate utilises the heat generated by the combustion in the internal combustion section of the engine.

All high grade 'waste' heat from the engine is recovered using counter-current heat exchangers. The ORC section heats a suitable ORC organic fluid such as ethanol or methanol or a 'hybrid' alternative.

Figure 3:
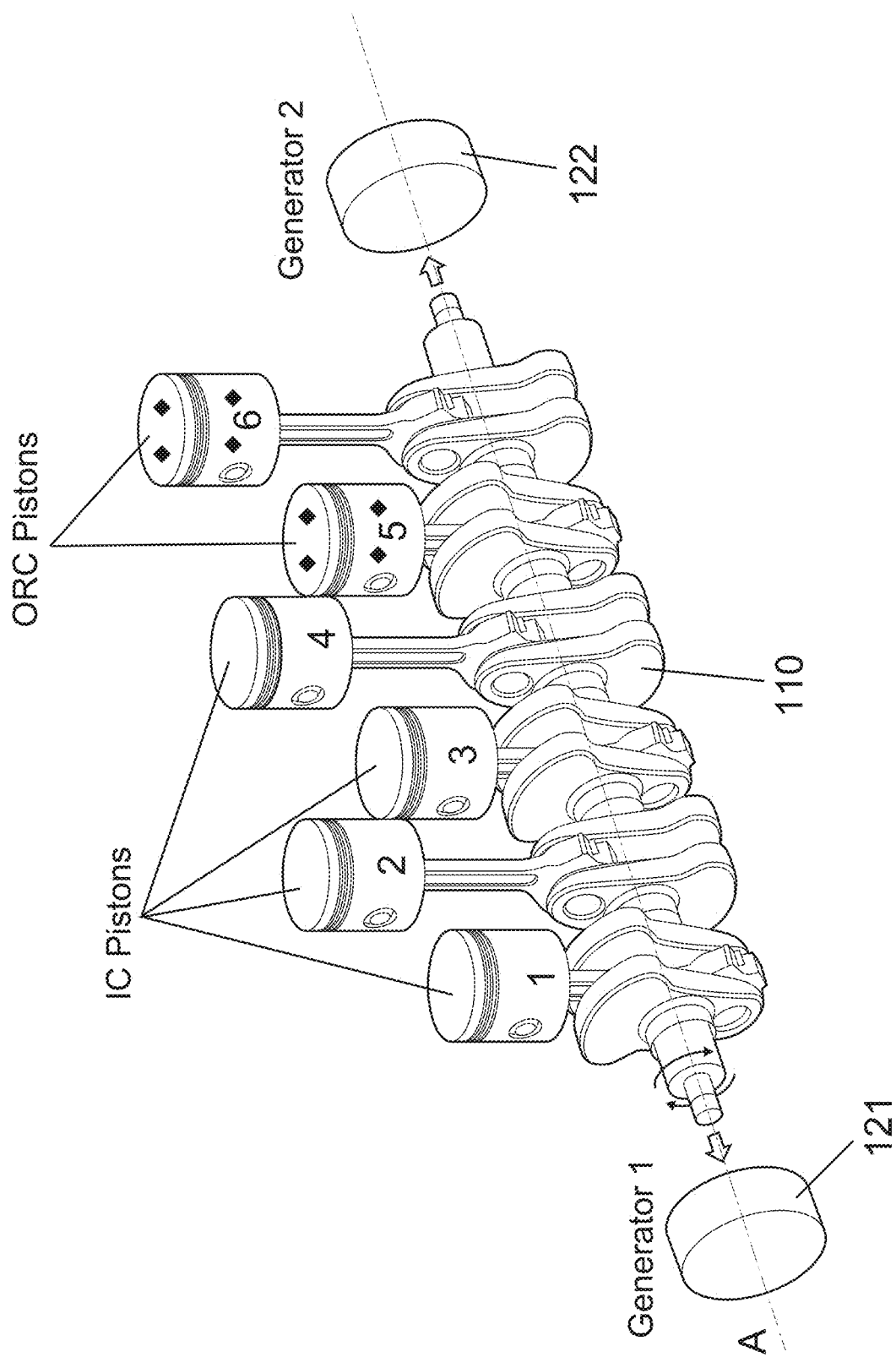
FIG. 3 illustrates a typical Crankshaft with Con-rods and with IC and ORC Pistons, wherein each end of the crankshaft is coupled to an electric generator, in accordance with the invention.

The IC section and the ORC section generate power to displace their respective IC and ORC pistons independently of each other. However, as the IC and ORC pistons are connected to and drive a common crankshaft, their firing and displacement timing is synchronised to achieve maximum energy transfer from piston displacement to crankshaft rotation, and thus maximum extracted work. FIG. 3 shows a crankshaft 110 connected to IC and ORC pistons.

Dual Function Motor-Generators

In one embodiment, the mono-block engine is coupled to one or more electric generators. At least one end of the crankshaft is coupled to one or more electric generators. The coupling is so that the shaft of the one or more generators is coupled/connected to the crankshaft of the mono-block, either directly or via gear arrangements. The coupling can be at the ends of the shaft and the crankshaft. The one or more electric generators is connected to and arranged to charge a rechargeable battery pack or a supercapacitor pack.

The shaft of the one or more generators is coupled in line with the crankshaft of the engine, so that the crankshaft and the generator shaft extend in the same virtual linear axis running across the length of the crankshaft. When more then one generators are connected they may be coupled in series in line in the same virtual linear axis, forming one long continuous joint-shaft. Electro-mechanical clutches may be employed to couple or de-couple generators from the continuous joint-shaft.

FIG. 3 shows a crankshaft 110 which may be coupled to at least one generator 121 and 122; and the coupling is in series in line in the same virtual linear axis A, forming one long continuous joint-shaft.

Alternatively, the crankshaft and the generator shaft may be coupled by gears in various angular or parallel arrangements.

The one or more electric generators rechargeable battery pack or a supercapacitor pack are arranged to drive an electric motor.

In a further embodiment, the electric generator may be arranged to crank the engine for it to start, i.e. act as starter motor(s) to the mono-block engine. One or more of the motor generators may be used as a starter motor to crank the engine on start-up. To initiate ignition (if more than one motor-generators are installed) an e.g. via an electronic clutch may be used to decouple all the generators that are not required for the engine start-up process.

The one or more electric generators coupled at least one end of the crankshaft are arranged to achieve dynamic balancing of the crankshaft.

The electric generators may be situated at front or rear power take-offs from the crankshaft.

The design of the motor-generator(s) is preferably oil-cooled pancake design with high high-grade heat recovered to the ORC process or switched reluctance design.

Engine load and power generation may be controlled by switching off or mechanically decoupling one or more generators as required, e.g. via an electronic clutch.

Motor generators will effect regenerative braking with energy recovered being stored in the ultra/super capacitor or battery packs.

IC and ORC Operations

Depending on the work and load requirements the IC and ORC sections may be operating simultaneously or each section may be turned off separately. As an example, the IC section is operational and the ORC section may be turned off until the engine and the ORC subsystem reach the required ORC operating temperatures. Likewise, the IC section may be turned off and the ORC section will continue to operate the crankshaft and charge the battery bank until all heat has been scavenged from the engine and all the heat has been depleted in the ORC fluid and ORC section.

Because the IC and ORC sections are in the same engine block a combination of IC and ORC cylinder numbers may be configured depending on the type of engine and work required.

The invention works with a new customised mono-block as well as repurposing and modifying a standard ICE engine block, wherein a number of the cylinders and pistons is left untouched for IC operations and the remaining cylinders and pistons are arranged to be driven by the ORC subsystem.

The principles of the proposed invention are applicable to any engine block with two or more cylinders, and in various alignments, such as inline, V-shape, W-shape, boxer, linear etc. The proposed mono-block may be utilised for vehicle engines, truck engines, large marine, static and rail power plant etc.

Figure 2:
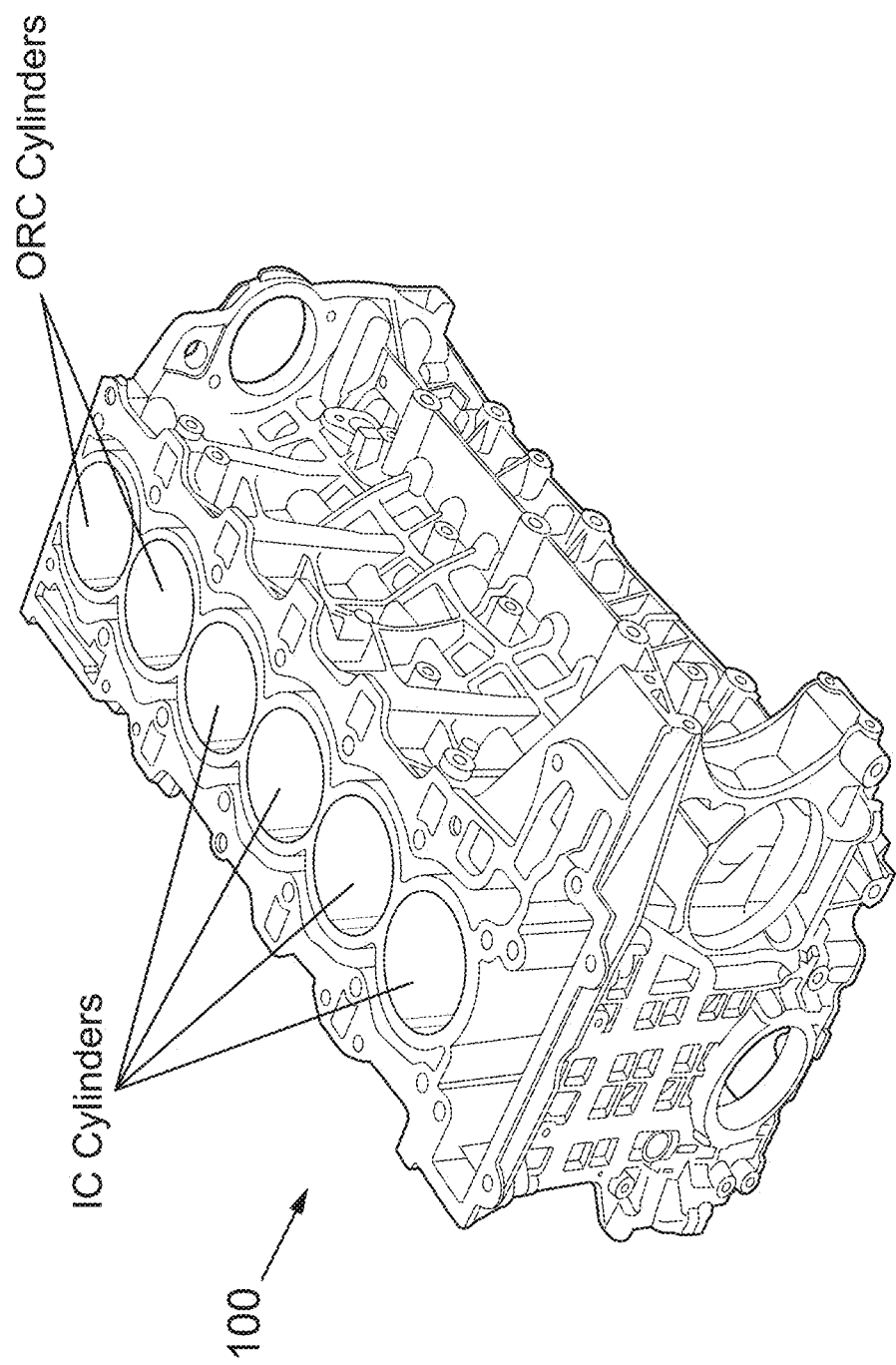
FIG. 2 illustrates a typical IC Engine block that may be used to achieve the invention.

To better describe the invention, an example employing a 6 cylinder block, as shown in FIG. 2, will be described.

Referring to FIG. 1, the block of FIG. 2 has been modified so that cylinders 1 to 4 are kept as IC cylinders and cylinders 5 and 6 are modified to be driven by the ORC section. The arrangement has been further shown in FIGS. 3, 9, 10 and 14.

The IC and ORC cylinders have been shown in this arrangement as an example and for ease of referencing in order to convey the invention. Other arrangements are possible, wherein the IC cylinders may be in front of the ORC cylinders, or the IC and ORC cylinders are evenly or unevenly reciprocated.

In some embodiments, in order to increase the heat extraction from the engine the ORC cylinders are arranged to preferably be close to the water, coolant pump.

Referring to FIG. 1, the mono-block 100 comprises an IC section 200 and an ORC section 300. For the purpose of this example, the block comprises cylinders 1, 2, 3, 4 as IC cylinders and cylinders 5 and 6 as ORC cylinders. The respective pistons of these cylinders are referred to with the same numbering, i.e. piston 1, piston 2 and so on.

FIG. 2 illustrates a typical IC Engine block 100 that may be used to achieve the invention, and FIG. 3 shows the crankshaft 110 of the engine.

Figure 9:
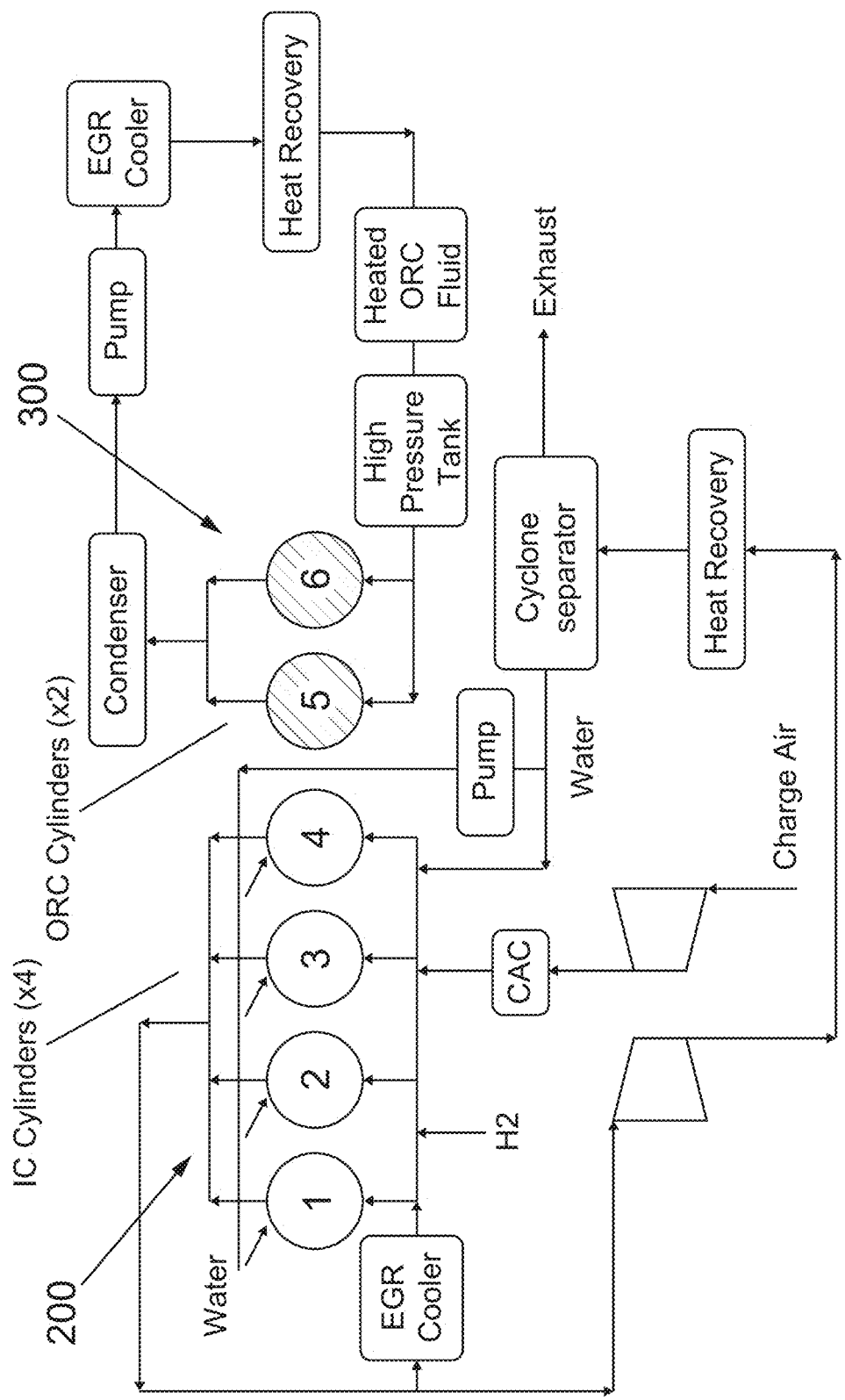
FIG. 9 illustrates a detailed diagram of an embodiment of the processes and components of the IC-ORC mono-block engine in accordance with the invention, wherein the ORC inlets are in parallel and ORC fluid is injected individually to each ORC cylinder, and the ORC pistons operate in a single expansion stage: inject-expand-extract to condenser, i.e. one downward/downstroke displacement of piston per ORC fluid injection into the ORC cylinder, and then ejection of the ORC fluid into the condenser on the upward/upstroke displacement of the piston.
Figure 10:
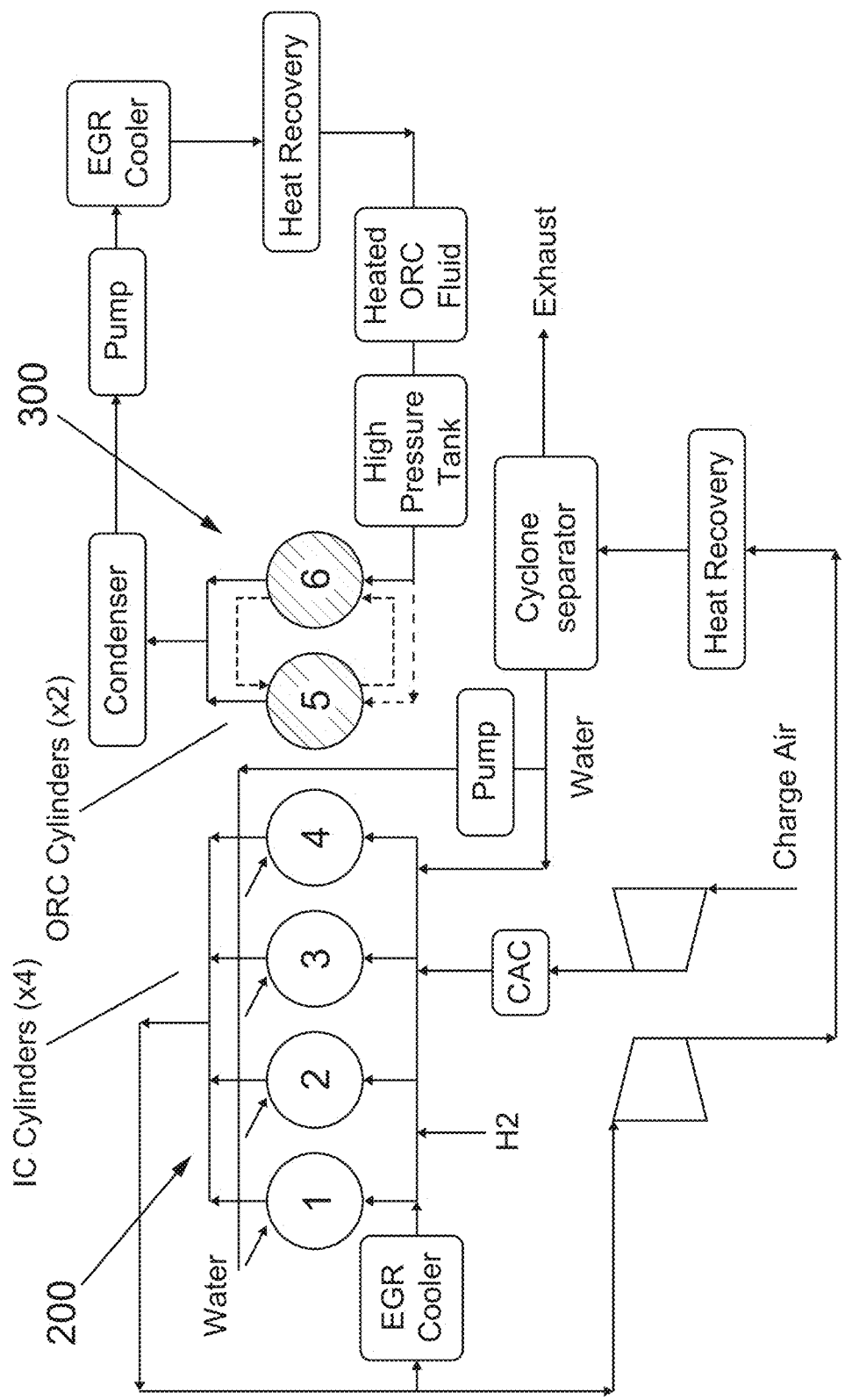
FIG. 10 illustrates a detailed diagram of another embodiment of the processes and components of the IC-ORC mono-block engine in accordance with the invention, wherein the ORC inlets are in series and/or have a top-up in parallel, wherein the ORC fluid is circulated and transferred in series between ORC cylinders so that the ORC pistons operate in multiple expansion stages per one 'fresh' ORC fluid injection: e.g. inject into cylinder 5—displace piston 5—eject ORC fluid and transfer to inject into cylinder 6—displace piston 6—{transfer ORC fluid back cylinder 5—repeat times n}—then eject to condenser, i.e. repetitive expansions in the cylinders per single ORC fluid injection into the ORC cylinders until the ORC fluid pressure and heat is deemed, by a controller, to have been spent, based on data from the pressure and temperature sensors shown in FIG. 4b.

Referring to FIGS. 9 and 10, the invention proposes a mono-block reciprocating piston engine power plant comprising two or more cylinders each having a piston housed therein (an example with 6 cylinders: 1, 2, 3, 4, 5 and 6) is shown, wherein cylinders 1 to 4 are IC section cylinders and cylinders 5 and 6 are ORC section cylinders);

an internal combustion IC section 200 controls the displacement of at least one of the pistons 1 to 4 and; an Organic Rankine Cycle ORC section controls the displacement of at least one of the pistons 5 and 6; wherein the IC and ORC pistons connect to and drive a common crankshaft 110 of the mono-block engine power plant 100; and wherein the Organic Rankine Cycle operates by the heat generated by the combustion in the internal combustion section, and the displacement of the pistons in the ORC section is achieved by injecting heated and pressurised ORC fluid.

Looking at the IC section 200, combustion fuel such as Hydrogen H2 is injected into the cylinders 1 to 4. Atomised water (more detail below and in FIG. 11) is also injected in the IC cylinders.

Heat Recovery—Heat is recovered from the IC section of the engine from the exhaust and EGR and from the engine cooling system, as well as scavenged heat.

The recovered heat is used to operate an Organic Rankine Cycle ORC. Referring to FIGS. 9 and 10, heated ORC fluid from the Heat Recovery is collected in an High Pressure Tank. Heated and pressurised ORC fluid is then injected into the ORC section cylinders (5 and 6). The ORC fluid is injected to the cylinder(s) whose piston is at the Top Dead Centre and the injected ORC fluid causes a full downward displacement of the piston therein.

FIG. 9 illustrates a detailed diagram of an embodiment of the processes and components of the IC-ORC mono-block engine in accordance with the invention, wherein the ORC inlets are in parallel and ORC fluid is injected individually to each ORC cylinder, and the ORC pistons operate in a single expansion stage; inject-expand-extract to condenser, i.e. one downward/downstroke displacement of piston per ORC fluid injection into the ORC cylinder, and then ejection of the ORC fluid into the condenser on the upward/upstroke displacement of the piston.

Therefore, in one embodiment heated and pressurised ORC fluid is injected from a high pressure tank into an ORC section cylinder causing downward displacement of the piston therein, and on the upward displacement of the piston the ORC fluid is ejected into a condenser, to be recirculated in the ORC cycle. The inlets of cylinder 5 and 6 are independent of each other and inject ORC fluid in accordance with the stroke timing. ORC fluid from the condenser is pumped back into the cycle to be heated by the EGR cooler (see FIG. 7) and the Heat Recovery, and then feed back into the High Pressure Tank and so on.

FIG. 10 illustrates a detailed diagram of another embodiment of the processes and components of the IC-ORC mono-block engine in accordance with the invention, wherein the ORC inlets are in series and/or have a top-up in parallel, wherein the ORC fluid is circulated and transferred in series between ORC cylinders so that the ORC pistons operate in multiple expansion stages per one 'fresh' ORC fluid injection; e.g. inject into cylinder 5—displace piston 5—eject ORC fluid and transfer to inject into cylinder 6—displace piston 6—{transfer ORC fluid back cylinder 5—repeat times n}—then eject to condenser, i.e. repetitive expansions in the cylinders per single ORC fluid injection into the ORC cylinders until the ORC fluid pressure and heat is deemed, by a controller, to have been spent, based on data from the pressure and temperature sensors shown in FIG. 4b.

Referring to FIG. 10, the ORC cycle in the ORC cylinders can be according one of the two embodiments below:

Heated and pressurised ORC fluid is injected from the high pressure tank into a first ORC section cylinder (5) causing downward displacement of a first piston therein (piston 5); on the upward displacement of the first piston (5) the ORC fluid is ejected from the first cylinder (5): wherein if the ORC fluid pressure and heat have decreased below predefined first thresholds, the ORC fluid is deemed a spent-fluid and is ejected into a condenser to be recirculated in the ORC cycle; if not, then the ORC fluid is transferred and injected into a second ORC section cylinder (6) causing downward displacement of a second piston (6) therein; wherein the ORC fluid is thus continuously circulated between the ORC section cylinders (5 to 6 to 5 to . . . ) until deemed spent; and wherein when the spent ORC fluid is ejected into the condenser it is replaced with heated and pressurised ORC fluid injected into one of the cylinders from the high pressure tank.

A controller acquires the pressure and heat data from the heat and pressure sensors (see FIG. 4b) and controls the flow of the ORC fluid to either the next cylinder in the process or to the condenser.

In another embodiment the heated and pressurised ORC fluid is injected from the high pressure tank into a first ORC section cylinder 5 causing downward displacement of a first piston 5 therein; on the upward displacement of the first piston 5 the ORC fluid is ejected from the first cylinder: wherein if the ORC fluid pressure and heat are above predefined second thresholds, the ORC fluid is transferred and injected into a second ORC section cylinder 6 causing downward displacement of a second piston therein 6; if not, then part of the ORC fluid is ejected into the condenser, to be recirculated in the ORC cycle, and the part is replaced with heated and pressurised ORC fluid from the high pressure tank; the resulting mixed ORC fluid is then injected into the second ORC section cylinder 6 causing downward displacement of a second piston 6 therein; and wherein the ORC fluid is thus continuously mixed and recirculated between the ORC section cylinders.

Figure 12:
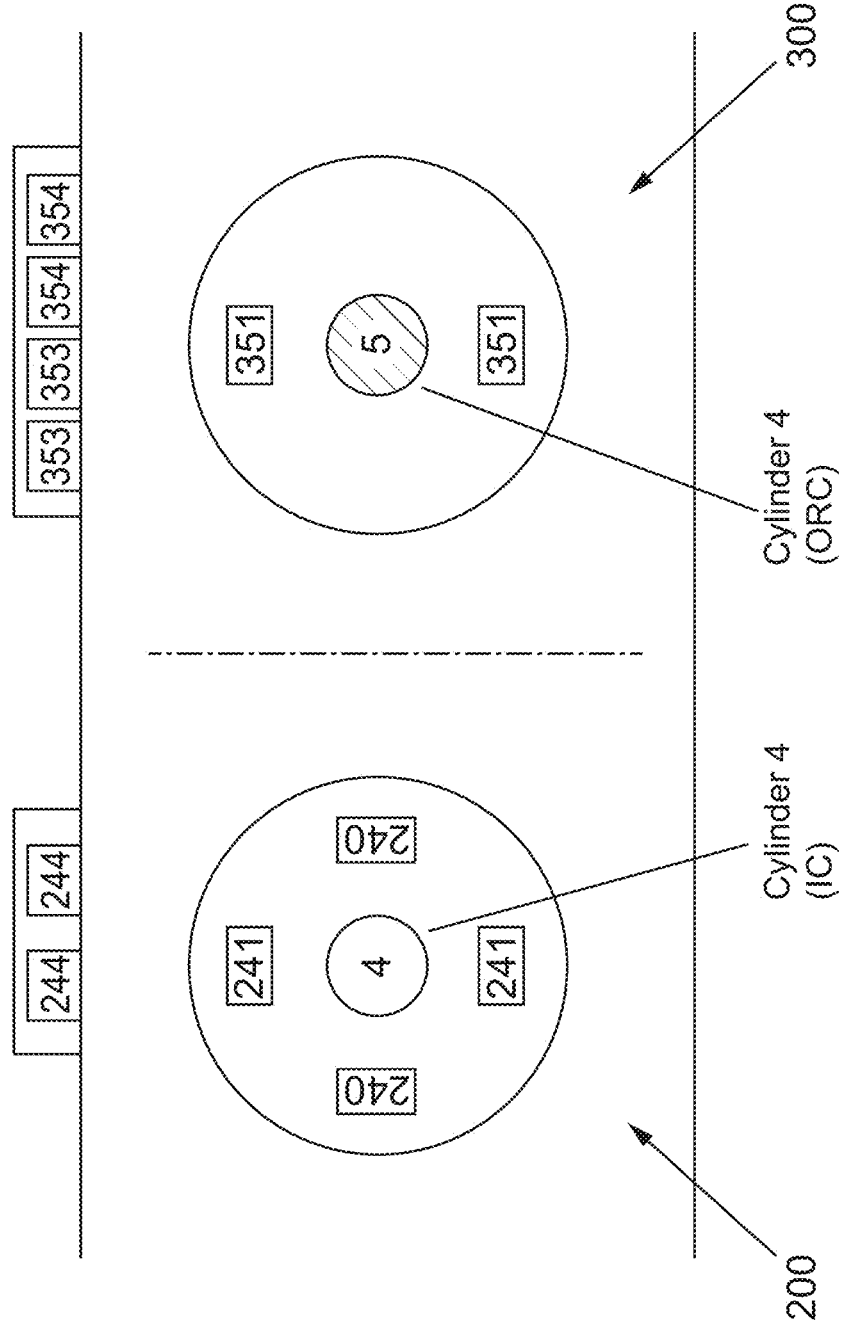
FIG. 12 illustrates a diagram of IC cylinder 4 and ORC cylinder 5 with their respective input and output ports/valves, in accordance with the invention.

FIG. 12 shows a schematics of the inlets and outlets of an IC cylinder and an ORC cylinder. More specifically, in the IC section 200 is shown IC cylinder 4 with combustion fuel injector-inlet valve together referenced as 241, and atomised water injection valve 240, and exhaust valves 244.

In the ORC section 300 is shown ORC cylinder 5 with ORC fluid inlet valves 351, circulation outlet fluid valve to next ORC cylinder 353 (e.g. when ORC fluid is transferred to ORC cylinder 6), and outlet fluid valve 354 to condenser.

Figure 13:
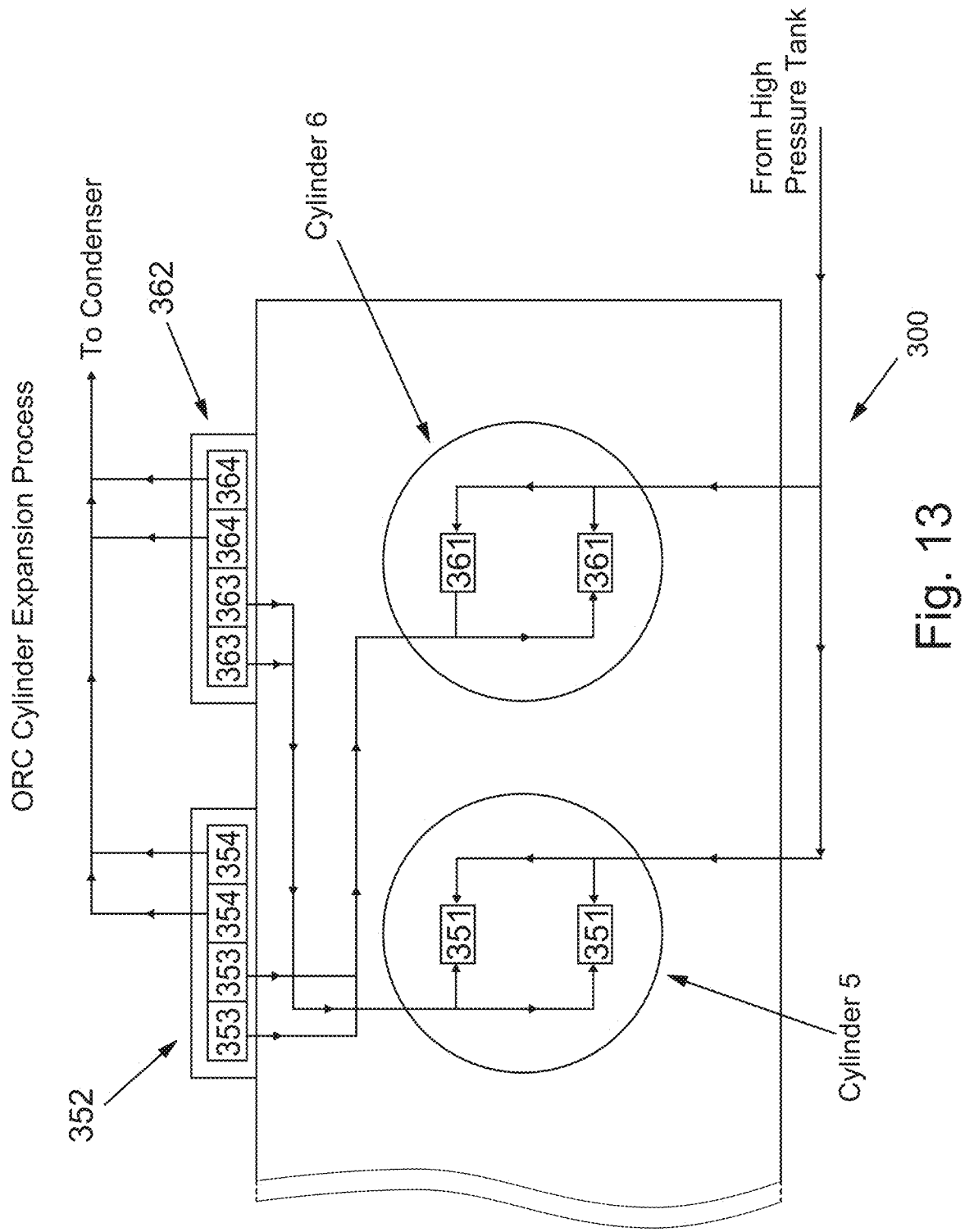
FIG. 13 illustrates a diagram of ORC cylinder 5 and ORC cylinder 6 with their respective input and output ports/valves, as well as the ORC fluid paths in accordance with embodiment of FIG. 10.

FIG. 13 shows a schematics of the inlets and outlets of two ORC cylinders 5 and 6 in ORC section 300, as well as the ORC fluid paths in accordance with embodiment of FIG. 10.

Cylinder 5 comprises ORC fluid inlet valves 351, and cylinder 6 comprises ORC fluid inlet valves 361, both of which may receive ORC fluid from the High Pressure Tank and/or the circulation ORC fluid valve/outlet of another ORC cylinder. E.g. circulation outlet fluid valve to next ORC cylinder 363 of cylinder 6 transfers ORC fluid into cylinder 5. E.g. circulation outlet fluid valve to next ORC cylinder 353 of cylinder 5 transfers ORC fluid into cylinder 6. If more then two ORC cylinders are available then the circulation of fluid is controlled by a ORC circulation fluid controller and is also dependent on the stroke cycle of the ORC cylinders.

FIG. 13 further shows the outlet fluid valve to condenser 354 of cylinder 5 and outlet fluid valve to condenser 364 of cylinder 6, are further shown.

ORC Cylinders

Figure 4:
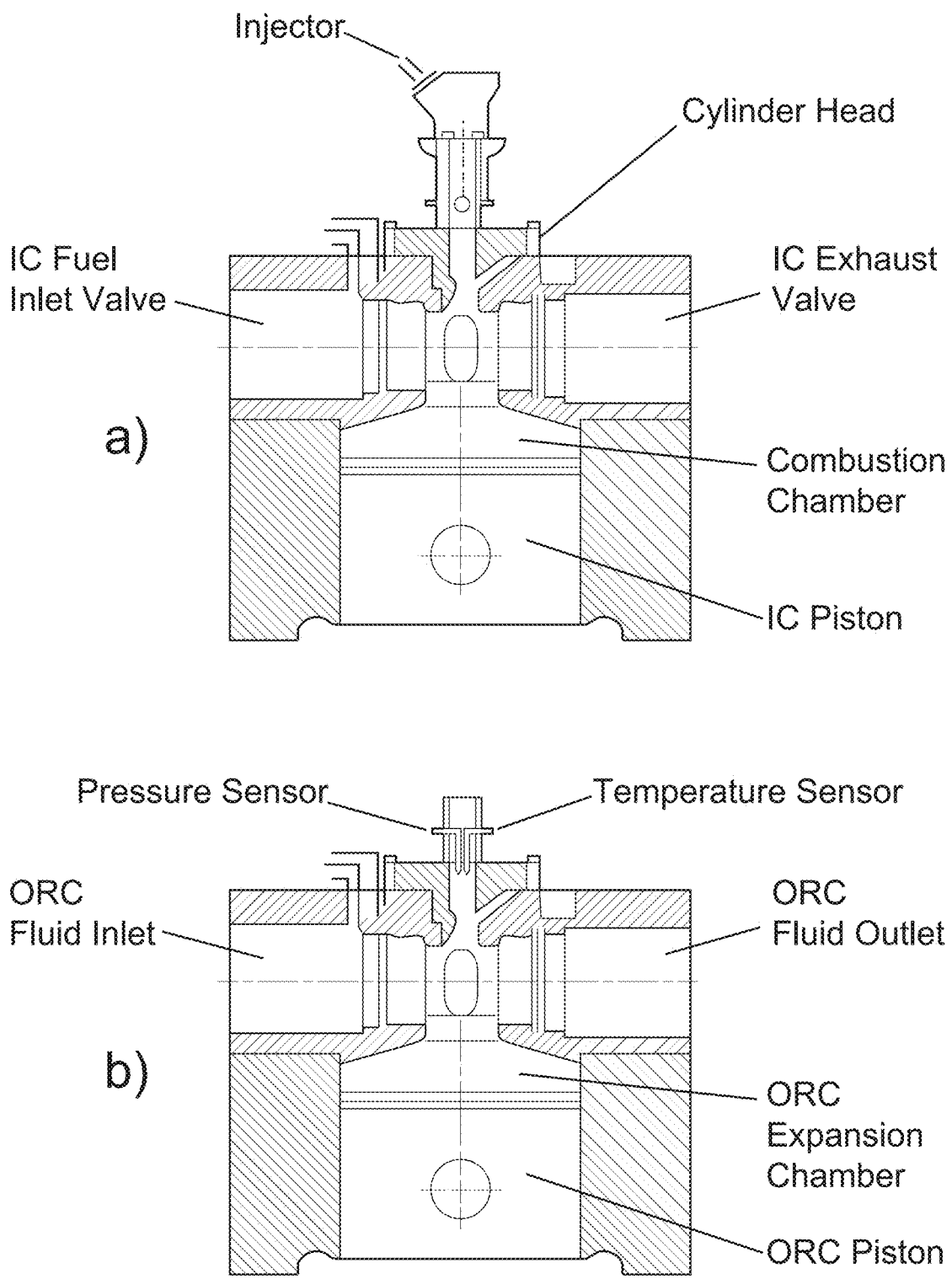
Figure 5:
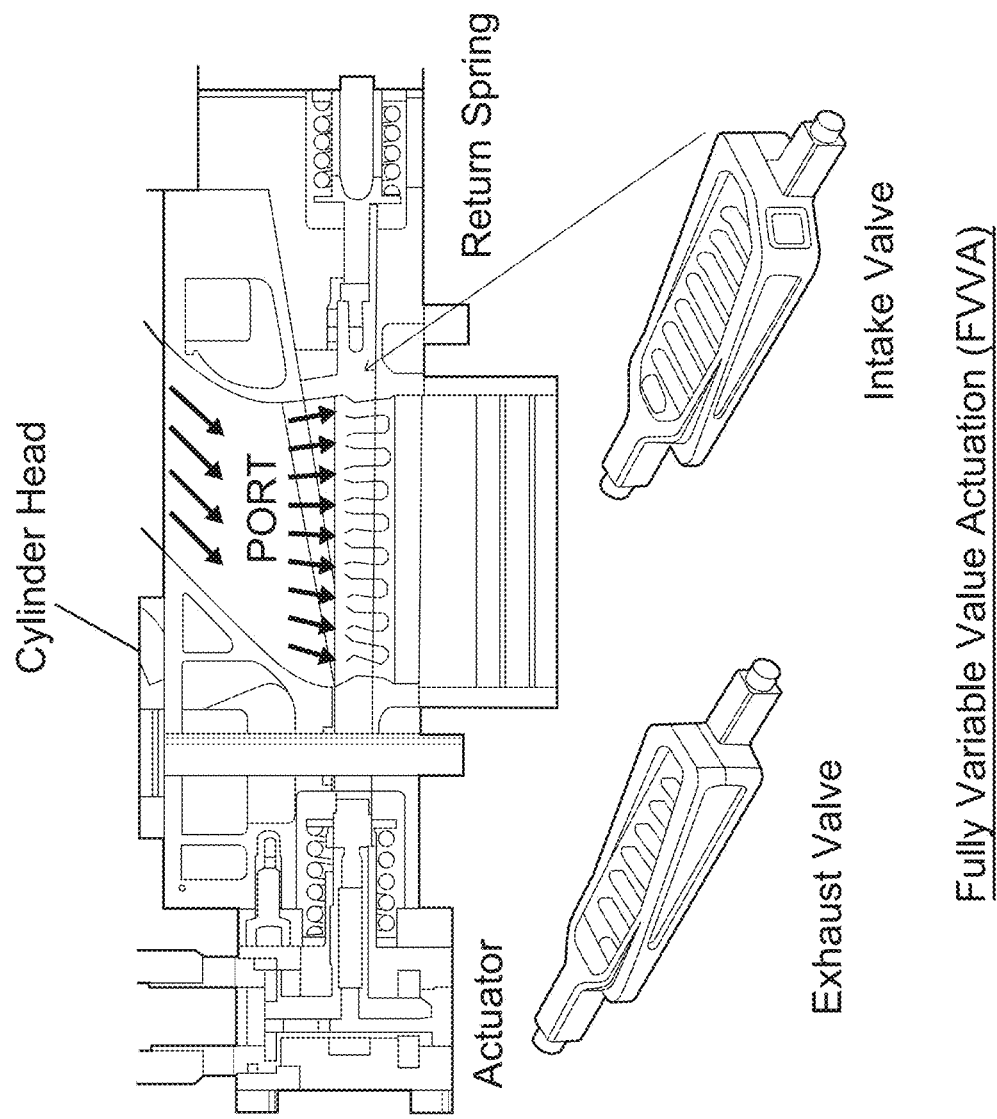
FIG. 5 illustrates a Fully Variable Valve Actuation (FVVA); in accordance with the invention.

Referring to FIG. 4, the ORC modified cylinder will keep the same configuration as per IC cylinders. The cylinder head might change to accommodate the changes. The IC fuel inlet valve is modified to become the ORC fluid inlet; the IC exhaust valve becomes an ORC fluid outlet. Fully Variable Value Actuation (FVVA) as shown in FIG. 5 may be used as ORC Fluid inlet and outlet ports/valves.

The old injector opening may be modified to house a pressure and heat sensor to measure the pressure and heat of the ORC fluid inside the cylinder. Standard pistons are operational for ORC but preferably the ORC section piston will be concave.

Figure 11:
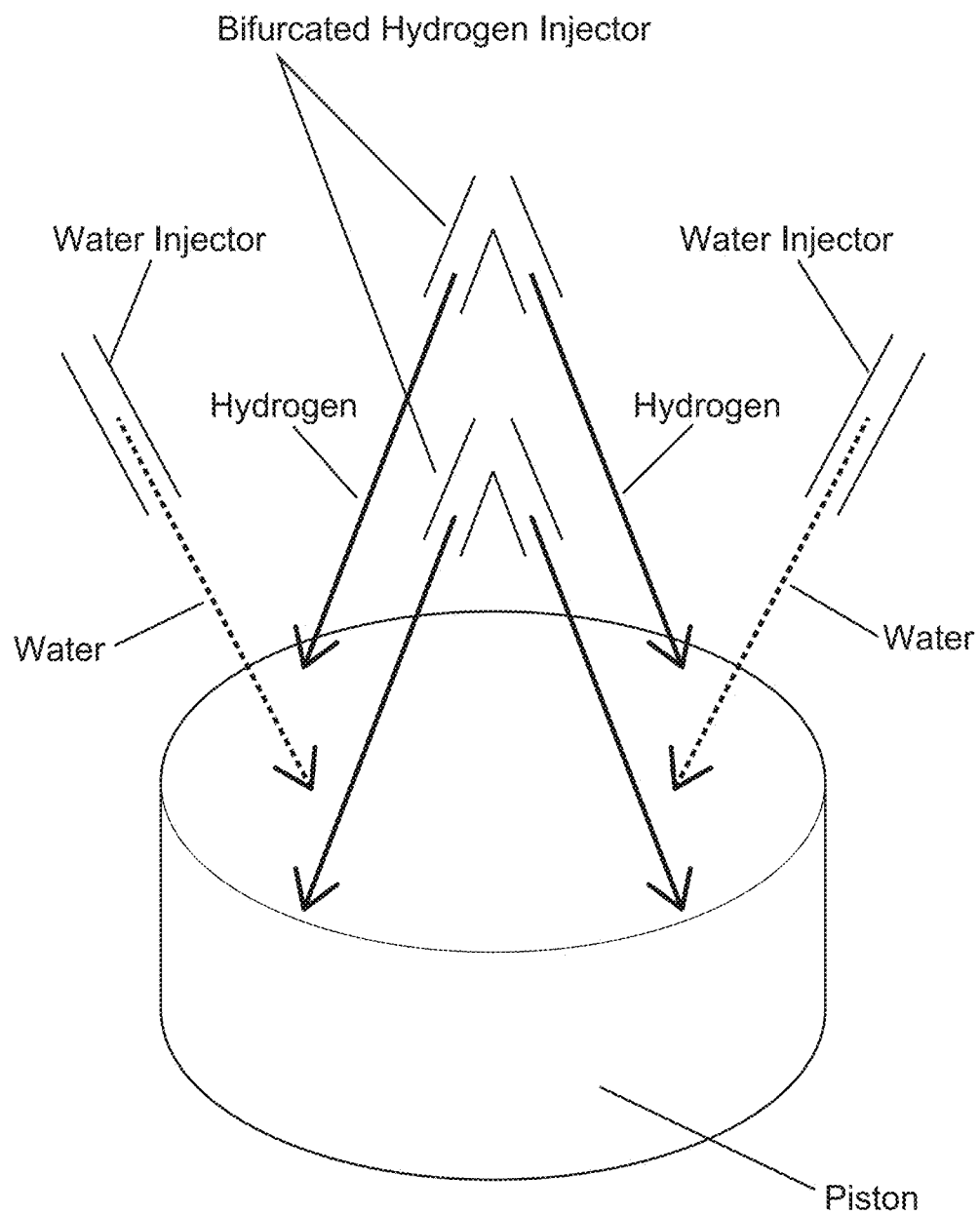
FIG. 11 illustrates a schematic of a bifurcated Hydrogen and atomised water injections into the IC cylinders, in accordance with the invention.

As shown in FIGS. 10 and 11, heated ORC Fluid is collected and held in a High pressure tank until injected into an ORC section cylinder via Standard fully variable valve (s), depending on application up to two per ORC cylinder. Once injected the ORC fluid expands exerting power on the piston driving it down the cylinder to BOC. The action of crankshaft and Con-rod will then drive the piston back to TDC. The spent or semi-spent ORC fluid, dependent upon residual heat and pressure may then be injected into a second ORC Cylinder. This process will continue between the two ORC cylinders until all useful energy has been used. The ORC fluid is then returned to the condenser via the outlet valve(s).

Figure 6:
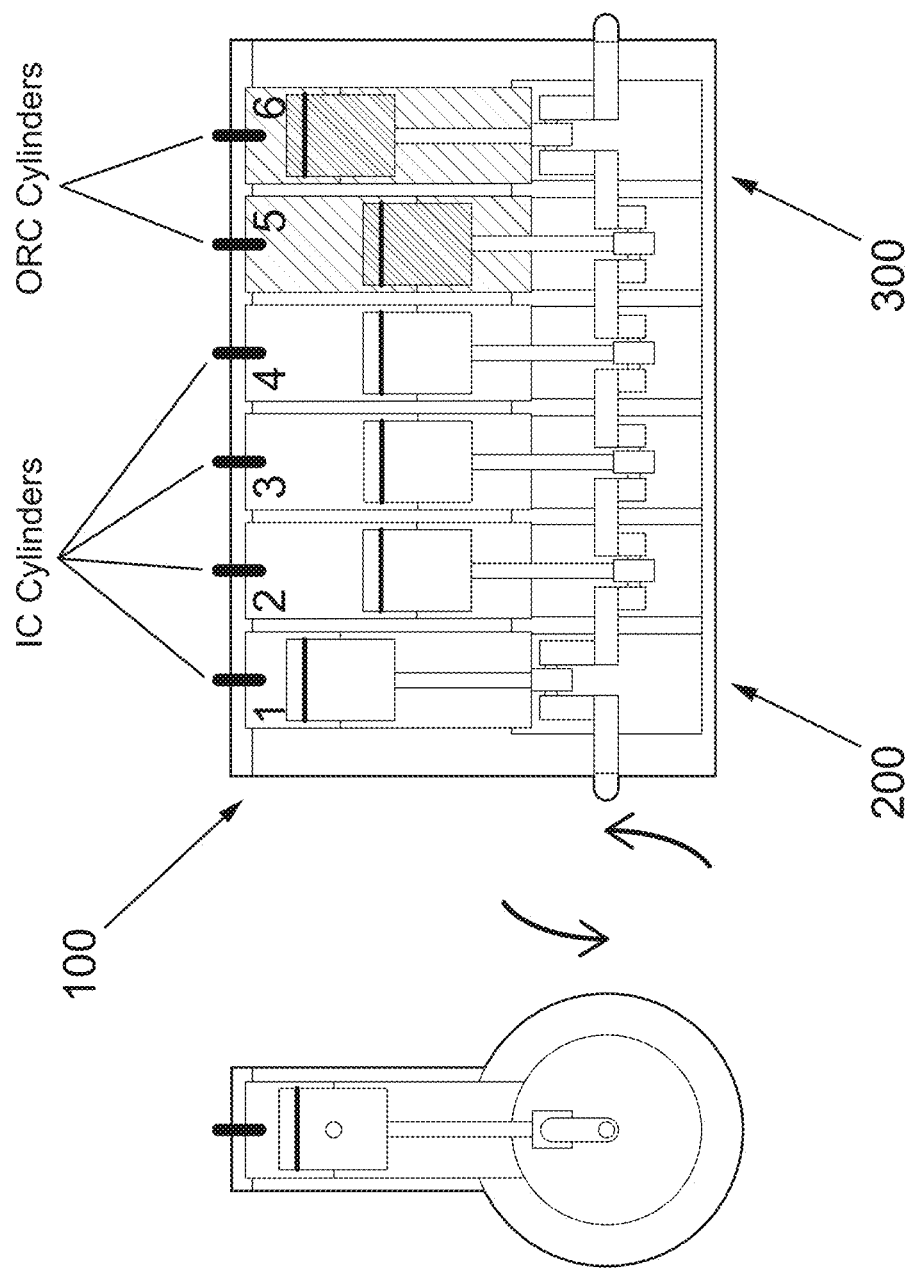
FIG. 6 illustrates an example arrangement and timing cycles of the IC and ORC piston-cylinders, driving a common crankshaft, in accordance with the invention.

Referring to FIG. 3 and FIG. 6, the ORC pistons are arranged to be one at Top Dead Centre TDC and the other at Bottom Dead Centre BDC. This is so that maximum work is extracted from an ORC expansion from TDC to BDC in a first piston downstroke, and the other piston is at the opposite peak, so that in a transfer of fluid between cylinders maximum work is extracted.

As an example, the cylinder block of an IC engine is maintained at below 70 degree Celsius at normal operating conditions—i.e. the resultant expansion of the fluid as the downstroke of the piston increases the volume and reduces the pressure in the first cylinder. This expansion is endothermic. Thus work is done by the ORC on the first piston.

On the upstroke of the first piston, the slightly reduced pressure ORC fluid is transferred to the adjacent second cylinder. On the downstroke of the second piston if the ORC fluid is still above a set pressure and temperature threshold, it is transferred back to the first cylinder. If the fluid is below the thresholds it is ejected into a condenser and the inlet valve of the first piston opens to receive the new ORC fluid to extract more work. When all useful mechanical work is extracted, a divert valve directs the fluid to the condenser. A controller may actuate a three way valve and based on the remaining pressure of the ORC fluid. i.e. to either dump to condenser and re-charge high pressure ORC to the first cylinder. The fully independent variable valve system permits this flexibility. The process is iterative.

The ORC section heats a suitable ORC organic fluid such as ethanol or methanol or a 'hybrid' alternative. As an example when using ethanol, at normal temperature and pressure, NTP, temperature of 20° C. and an absolute pressure of 1 atm (101.325 kPa) the boiling point of ethanol is circa 70° C. The cylinder block temperatures will be +/−70° C. Thus a significant endothermic reaction is expected. This will optimise the potential for mechanical work and the spent ORC fluid to become close to its liquid state on return to condenser. The maximum temperature of the ORC system is estimated at +/−500° C., dependant on application and power output.

In one embodiment, lateral action hydro or pneumatic spring design inlet and exhaust valves allow for a valve chest encompassing a final ORC exhaust valve to complete the ORC cycle. Up to 2 valves per ORC cylinder may be used dependent upon application. These may be horizontal, lateral, action. The condition of the ORC fluid will determine the number of ORC expansions possible (transfer of fluid from one cylinder to the other). In other embodiments electro-mechanical valves may also be employed.

All cylinders, both ICE and ORC are preferably wet lined to enable flexible control of cylinder cubic capacity.

The mechanical architecture with the IC cylinders and use of cylinders as ORC expanders within same mono-block is unique.

Outline of the Engine

Efficiency is optimised through incorporating the following:
Maintaining steady state power unit Revolution Per Minute by connecting the crankshaft directly to one or more preferably pancake design ECDC motor/generators. Other means of electrical or shaft power generation could be applicable;

'Splitting' the cylinder block into a four 'combustion cylinder', four stroke configuration, with the remaining two cylinders powered by a 'two stroke acting' organic Rankine cycle design, utilising all sensible heat, recovered from subsystems and exhaust gases. Preferably the ORC fluid will be methanol or ethanol but other low or zero ozone depleting alternatives may be employed;

The 'ORC cylinders may operate as single stage, two stage or three stage expanders, dependant on the temperature/pressure condition of the ORC fluid. This being achieved by fast acting multi-way (preferably) inlet and exhaust valves operating across the two cylinders and the organic fluid exhaust;

In the example of a six-cylinder block, with a 'firing order of 1-5-3-6-2-4, cylinders 5 and 6 would preferably be dedicated to the ORC system, with cylinders 1, 3, 4 & 2 operating under four stroke compression ignition of the hydrogen fuel.

Preferably, PEM technology shall be incorporated in the combustion air inlet to enrich the oxygen supply to the ICE unit to reduce inert NOx gases.

Figure 7:
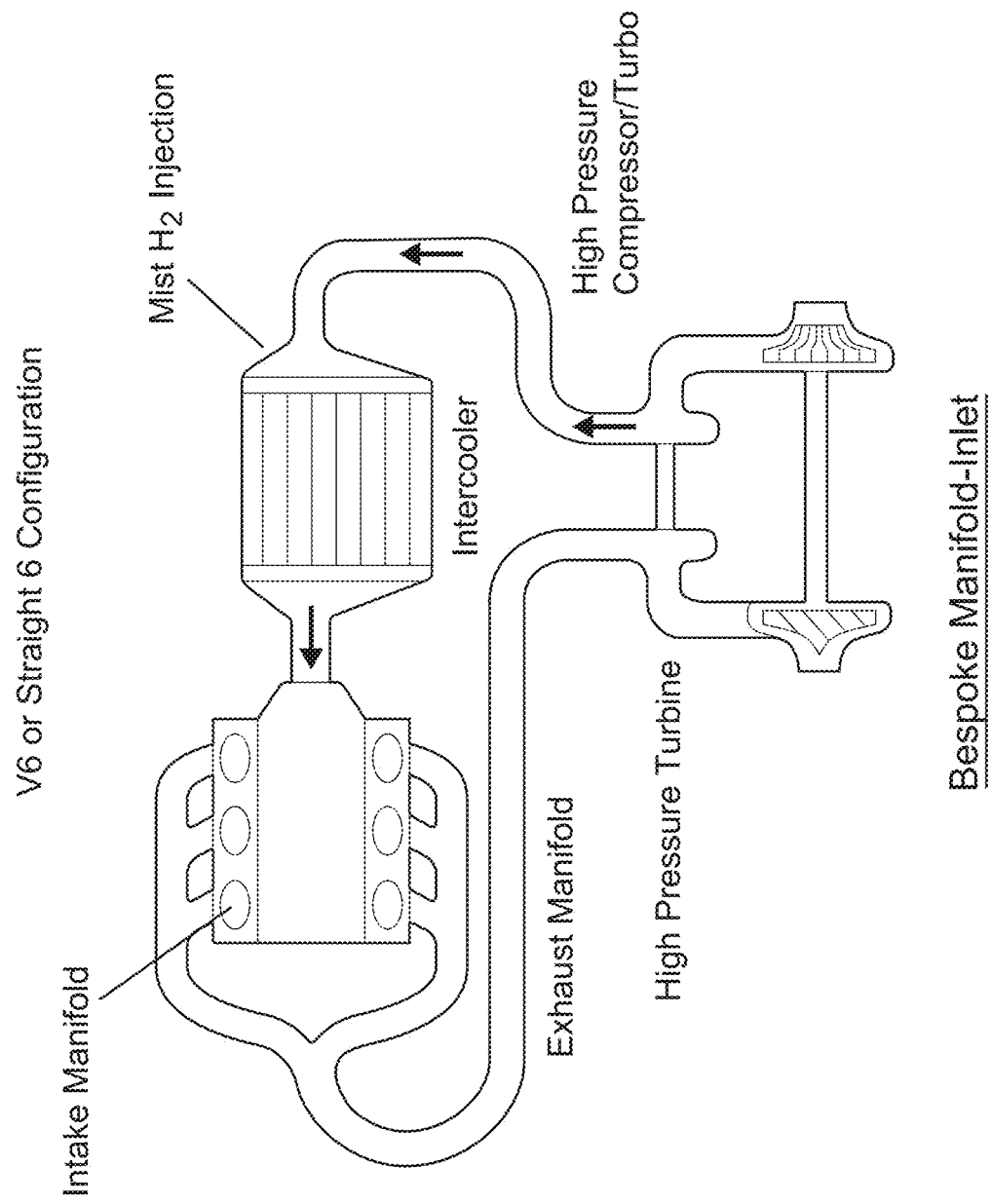
FIG. 7 illustrates a bespoke Inlet/Exhaust Manifold, in accordance with the invention.

A surge battery system will harvest excess power, e.g. regenerative braking in automotive applications, surplus generating capacity and thereby stored to meet high load conditions e.g. hill climb and initial start conditions;

The four combustion cylinders shall have the following features:
Spark assisted compression ignition system, preferably Mahler type;
Fully variable independently controlled inlet and exhaust valves to facilitate variable compression and also avoid unnecessary 'pumping losses;
Preferably, turbo-charging or super charging, to increase the induction charge;
The application of manifold water injection (inter cooler effect) together with direct (in cylinder) water injection, (harvested from condensed filtered water from the exhaust gases) to effect induction cooling, avoid cylinder hotspots, create highly turbulent fuel air mixing; minimise NOx formation through controlling maximum combustion gas temperatures and create flash steam to increase cylinder power output, as shown in FIG. 7;
The application of aggressive ignition timing to optimise efficiency and power;
The ability to 'switch out' an individual cylinder when the power is not required, reducing pumping losses;
The avoidance of the power losses associated with a camshaft drive system; separate starter motor, separate alternator, high pressure fuel pump (as in diesel) and minimised radiator fan cooling power requirements.

Figure 8:
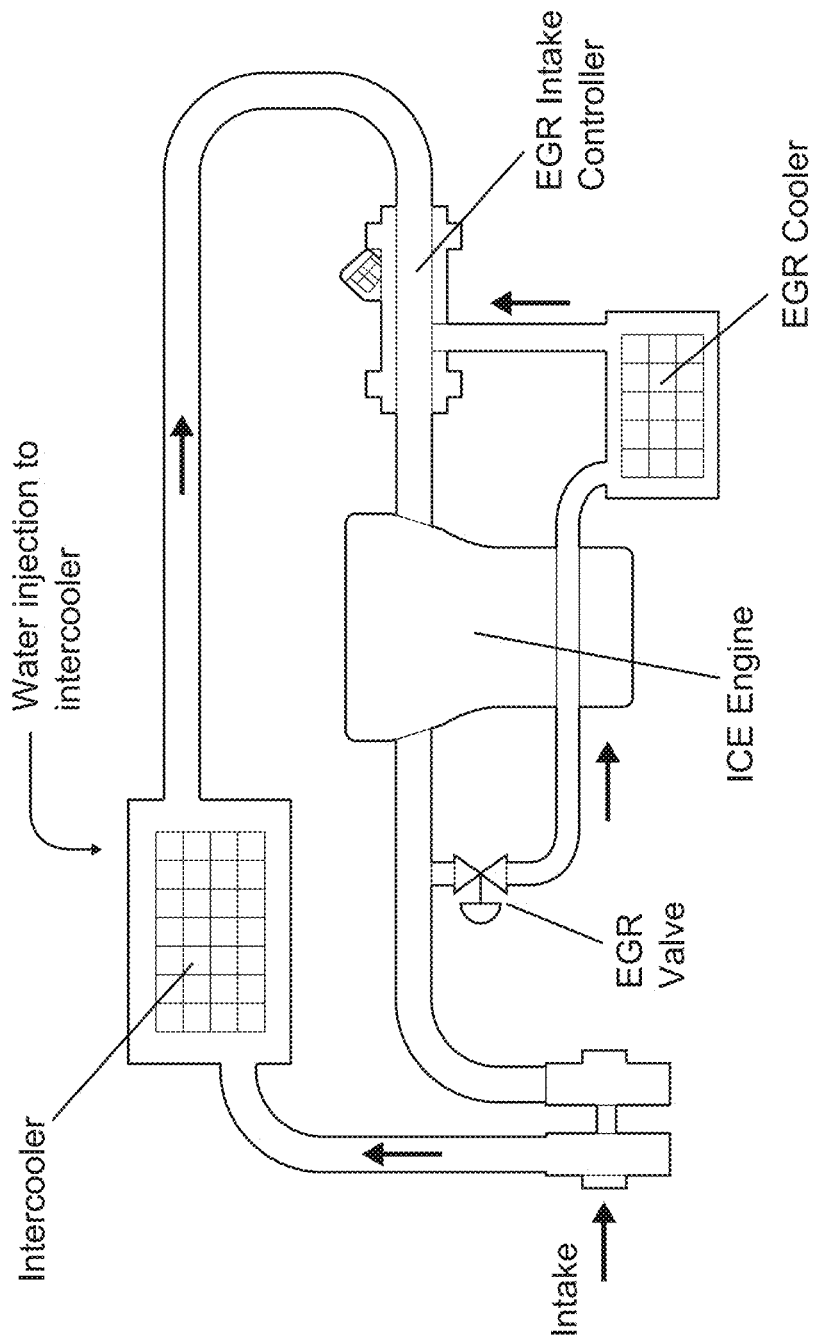
FIG. 8 illustrates an Exhaust Gas Recirculation (EGR) schematic, in accordance with the invention.

The engine uses a temperature and volume control of exhaust gas recirculation (EGR), as shown in FIG. 8 This will prevent pre-ignition and 'hot spot' pre combustion and it is anticipated that since the EGR gases will be partially pre-cooled, overall combustion efficiency of the ICE unit will be increased, whilst ensuring near zero NOx emissions.

Using Hydrogen as fuel in addition to the other auxiliary methods, the proposed invention has a potential MBHP efficiency within a range of 64% to 72%. There will be virtually zero particulate emissions. NOx emission levels will be negligible. There will be zero carbon monoxide and zero carbon dioxide emissions. Ozone depleting emissions will be below or close to below measurable levels. Only insignificant emissions are expected from lubrication oil.

The proposed power system can be manufactured at a lesser cost than fuel cells, and the efficiency will be similar or better than current fuel cell systems;

The proposed power system can be manufactured at a lesser cost than large battery systems. Life cycle maintenance costs will be less than either alternative and re-use/recycling will be at significantly lower cost. Furthermore, the proposed invention will aid in the recycling and refurbishing of engine blocks, which will then be able to produce cleaner power and drive an electric generator, a truck, a vehicle, a marine vessel etc.

The mono-block may be a new bespoke mono-block or it is a repurposed standard IC engine block, wherein a number of the cylinders and pistons are left intact for IC operations and the remaining cylinders and pistons are arranged to be driven by the ORC fluid inside the ORC section cylinders.

The Organic Rankine Cycle may recover heat from one or a combination of the engine mono-block, exhaust heat and/or engine cooling system. The Organic Rankine Cycle recovery utilises one organic ORC fluid, or two organic ORC fluids with two different temperature operating ranges, or a single hybrid ORC fluid arranged to operate with two or more different temperature operating ranges; when utilising a hybrid or two ORC fluids arranged to operate with two or more different temperature operating ranges, a first range is configured to operate from engine heat recovered from high temperatures such as exhaust heat, and a second range is configured to operate from engine heat recovered from coolant and general scavenging heat recovery.

Further details on the processes of the engine are provided below.

Hydrogen Combustion Processes

In one preferred embodiment wherein the IC section uses Hydrogen as fuel, the features below may be further used.

A minute quantity of Hydrogen is injected into a spark assist system, preferably a Mahler™ system, within a compression ignition engine.

Hydrogen fuel is injected at high pressure dependent upon power need (i.e. lean or stochiometric) from 3,000,000 to 10,000,000 Pascals.

The Hydrogen injectors may be singular, but in a preferred embodiment the Hydrogen injectors may be bifurcated to maximise mixing of Hydrogen with charge air gases, as shown in FIG. 11.

A greater range of injection pressures determined by opening and closing of the Hydrogen supply valve. Timing control is determined by power demand via ECU.

Power needs are dictated by the ECU. Likewise Exhaust Gas temperature monitoring is done via SSSI/ECU:
 i) Ultra-filtrated water (from EGR) is injected into cylinder head at a point immediately prior to the combustion temperature within the cylinder reaching a point where NOx will be formed, as shown in FIG. 11.
 ii) Atomised water injection is via two ultra-fine jets at an angle of between 5 and 12 degrees, as shown in FIG. 11, dependent upon cylinder diameter and stroke
 iii) Water injection prevents risk of 'hot-spotting' within the cylinder and exhaust valve to avoid pre-ignition.
 iv) This process will facilitate the 'flash-steam' process increasing power output from each ICE cylinder.
 v) Injected water will be timed to reach the peak ICE cylinder temperature zone immediately prior to NOx threshold temperature is reached.

The integration of water injection, flash steam and advanced combustion control within a Hydrogen fueled engine is unknown in the art The combined Hydrogen and Water injection into the Cylinder head is a unique configuration.

Referring again to FIG. 11, the Hydrogen injection profile may be a standard singly form injector or preferably a Bifurcated injector. The purpose of bifurcation of the hydrogen injectors is to optimise a rapid disbursement of the charge air and hydrogen to effect a homogenous combustible mixture in the cylinders.

An existing engine block, conrod, crankshaft, piston design and lubrication are modified as set out below:
 Strengthened con rods;
 Avoidance of incompatible metals;
 Strengthened Crankshaft (if required);
 ORC piston rings fabricated from PTFE or similar compound;
 The inclusion of WS2 and MS2 solid lubricants into the engine oil (reduced wear and lower friction losses) to address particularly the effect of a 'dry' fuel;
 Modified pistons as/if required;
 A re-designed cylinder head to accommodate the changes to the design of fully independent variable valves and actuators;
 Pistons are preferably concave.

When repurposing and modifying a standard ICE engine block the Head requires some modifications as noted below:
 Valve seat will need machined to accommodate valves and will require specialised metal coating. Dependent upon application either one or two inlet valves and one or two exhaust valves will be incorporated to each cylinder.

The cylinder head and valve gear will be modified. The valve seats for both IC and ORC cylinders will need to be modified to accept a fully variable fuel and fully variable ORC fluid injection and exhaust valves and actuators.

The modification will facilitate the fitting of fully-variable horizontal valves FVVA as the one shown in FIG. 5 as opposed to the standard vertical (poppet) valves.

Block & Sump—Positively vented sump to CA intake; Positive sump pressure monitoring to SSSI/ECU; and externally insulated cylinder block as far as is practicable.

Exhaust Manifold—Twin skinned construction to retain heat and insulated between skins; Exhaust gas temperature monitored for water injection process, as shown in FIG. 7.

Crank Shaft—Metallurgical hardening and coating of the crankshaft will be required under some conditions dependent on maximum power output; Crankshaft will be machined to allow front and rear power take-off; Crankshaft bearings will be of a material that resists degradation from any Hydrogen that may be present within the bottom of the block.

Con Rods—Will be metallurgically treated and strengthened to withstand Hydrogen fuel and greater power transfer; Con Rod bearings will be of a material that resists degradation from any Hydrogen that may be present within the bottom of the block.

The invention claimed is:
1. A mono-block reciprocating piston engine power plant comprising:
 two or more cylinders each having a piston housed therein;
 an internal combustion IC section controlling the displacement of at least one of the pistons;

an Organic Rankine Cycle ORC section controlling the displacement of at least another one of the pistons; and
a controller configured to control flow through the Organic Rankine Cycle ORC section;
wherein the IC and ORC pistons connect to and drive a common crankshaft of the mono-block engine power plant; and
wherein the Organic Rankine Cycle section operates by heat generated by combustion in the internal combustion section, and the displacement of the pistons in the ORC section is achieved by injecting heated and pressurised ORC fluid;
wherein the heated and pressurised ORC fluid is injected from a high pressure tank into a first ORC section cylinder causing downward displacement of a first piston therein;
on the upward displacement of the first piston the ORC fluid is ejected from the first cylinder:
wherein the controller is configured to:
if the ORC fluid pressure and heat have decreased below predefined first thresholds, the ORC fluid is deemed a spent-fluid and is ejected into a condenser to be recirculated in the ORC cycle;
if not, then the ORC fluid is transferred and injected into a second ORC section cylinder causing downward displacement of a second piston therein;
wherein the ORC fluid is thus continuously circulated between the ORC section cylinders until deemed spent; and
wherein when the spent ORC fluid is ejected into the condenser it is replaced with heated and pressurised ORC fluid injected into one of the cylinders from the high pressure tank.

2. A mono-block reciprocating piston engine power plant comprising:
two or more cylinders each having a piston housed therein;
an internal combustion IC section controlling the displacement of at least one of the pistons;
an Organic Rankine Cycle ORC section controlling the displacement of at least another one of the pistons; and
a controller configured to control flow through the Organic Rankine Cycle ORC section;
wherein the IC and ORC pistons connect to and drive a common crankshaft of the mono-block engine power plant; and
wherein the Organic Rankine Cycle section operates by heat generated by combustion in the internal combustion section, and the displacement of the pistons in the ORC section is achieved by injecting heated and pressurised ORC fluid;
wherein the heated and pressurised ORC fluid is injected from a high pressure tank into a first ORC section cylinder causing downward displacement of a first piston therein;
on the upward displacement of the first piston the ORC fluid is ejected from the first cylinder:
wherein the controller is configured to:
if the ORC fluid pressure and heat are above predefined second thresholds, the ORC fluid is transferred and injected into a second ORC section cylinder causing downward displacement of a second piston therein;
if not, then part of the ORC fluid is ejected into a condenser, to be recirculated in the ORC cycle, and the part is replaced with heated and pressurised ORC fluid from the high pressure tank;
the resulting mixed ORC fluid is then injected into a second ORC section cylinder causing downward displacement of a second piston therein; and
wherein the ORC fluid is thus continuously mixed and recirculated between the ORC section cylinders.

3. The engine of claim 1, wherein the mono-block engine is coupled to one or more electric generators.

4. The engine of claim 3, wherein the one or more electric generators are arranged to charge a rechargeable battery pack or a supercapacitor pack.

5. The engine of claim 4, wherein the one or more electric generators are arranged to crank the engine for the engine to start.

6. The engine of claim 5, wherein a shaft of the one or more generators is coupled in line with the crankshaft of the engine, so that the crankshaft and the generator shaft extend in the same virtual linear axis running across the length of the crankshaft.

7. The engine of claim 6, wherein at least one end of the crankshaft is coupled to the one or more electric generators.

8. The engine of claim 7, wherein the one or more electric generators coupled to the at least one end of the crankshaft are arranged to achieve dynamic balancing of the crankshaft.

9. The engine of claim 8, wherein the mono-block is a new bespoke mono-block or it is a repurposed standard IC engine block, wherein a number of the cylinders and pistons are left intact for IC operations and the remaining cylinders and pistons are arranged to be driven by the ORC fluid inside the ORC section cylinders.

10. The engine of claim 9, wherein the Organic Rankine Cycle section recovers heat from one or a combination of the engine mono-block, exhaust heat and/or an engine cooling system.

11. The engine of claim 10, wherein the Organic Rankine Cycle section utilises one organic ORC fluid, or two organic ORC fluids with two different temperature operating ranges, or a single hybrid ORC fluid arranged to operate with two or more different temperature operating ranges.

12. The engine of claim 11, wherein when utilising a hybrid or two ORC fluids arranged to operate with two or more different temperature operating ranges, a first range is configured to operate from engine heat recovered from high temperatures, and a second range is configured to operate from engine heat recovered from coolant and general scavenging heat recovery.

13. The engine of claim 12, wherein the cylinders are wet lined to enable flexible control of cylinder cubic capacity.

14. The engine of claim 13, wherein filtrated water, from EGR, is injected into an IC cylinder head at a point immediately prior to the combustion temperature within the cylinder reaching a point where NOx will be formed; and
the injected water is timed to reach the peak IC cylinder temperature zone immediately prior to NOx threshold temperature being reached.

15. The engine of claim 12, wherein the engine heat recovered from high temperatures is exhaust heat.

* * * * *